(12) United States Patent
Schäfer

(10) Patent No.: US 11,247,725 B2
(45) Date of Patent: Feb. 15, 2022

(54) STEERING CONTROLLER AND METHOD FOR ASCERTAINING AN ACTUATING SIGNAL FOR A POWER ELECTRONICS UNIT OF A STEERING APPARATUS OF A MOTOR VEHICLE

(71) Applicant: Volkswagen Aktiengesellschaft, Wolfsburg (DE)

(72) Inventor: Johannes Maria Schäfer, Werben OT Berge (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 14 days.

(21) Appl. No.: 16/638,860

(22) PCT Filed: Jul. 10, 2018

(86) PCT No.: PCT/EP2018/068662
§ 371 (c)(1),
(2) Date: Feb. 13, 2020

(87) PCT Pub. No.: WO2019/042640
PCT Pub. Date: Mar. 7, 2019

(65) Prior Publication Data
US 2020/0189660 A1     Jun. 18, 2020

(30) Foreign Application Priority Data
Aug. 28, 2017   (DE) .................... 10 2017 215 013.0

(51) Int. Cl.
  *B62D 15/02*   (2006.01)
  *B62D 5/04*    (2006.01)
  *B62D 6/00*    (2006.01)

(52) U.S. Cl.
  CPC ......... *B62D 15/029* (2013.01); *B62D 5/0463* (2013.01); *B62D 6/008* (2013.01)

(58) Field of Classification Search
  CPC .... B62D 15/02; B62D 15/021; B62D 15/025; B62D 15/0255; B62D 15/026;
  (Continued)

(56) References Cited

U.S. PATENT DOCUMENTS

| 6,148,951 A | 11/2000 | Nishi et al. ................. 180/446 |
| 6,293,561 B1 | 9/2001 | Goetzen et al. ............ 280/5.52 |

(Continued)

FOREIGN PATENT DOCUMENTS

| DE | 3736229 A1 | 9/1988 | ............... B60G 3/20 |
| DE | 19836440 A1 | 2/2000 | ............. B60G 21/00 |

(Continued)

OTHER PUBLICATIONS

International Search Report and Written Opinion, Application No. PCT/EP2018/068662, 8 pages, dated Oct. 23, 2018.

*Primary Examiner* — Khoi H Tran
*Assistant Examiner* — Sarah A Tran
(74) *Attorney, Agent, or Firm* — Slayden Grubert Beard PLLC

(57) ABSTRACT

A steering controller is disclosed, wherein the steering controller is configured in such a way as to obtain input signals from at least one sensor for detecting a steering request of a motor vehicle driver and at least one driver assistance system, wherein the steering controller is also configured to generate an actuating signal for a power electronics unit. The actuating signal is assembled from two components, wherein the steering controller is configured so that the first component is ascertained from the input signal from the at least one sensor. The signals from the driver assistance system have no influence on the first component.

(Continued)

The second component is ascertained from the input signals from the at least one driver assistance system, wherein the signals from the sensor are taken into account in the second component.

3 Claims, 2 Drawing Sheets

(58) Field of Classification Search
CPC .............. B62D 15/0265; B62D 15/029; B62D 15/0295; B62D 5/0457; B62D 5/046; B62D 5/0463; B62D 6/002; B62D 6/008
See application file for complete search history.

(56) References Cited

U.S. PATENT DOCUMENTS

| | | | |
|---|---|---|---|
| 6,347,802 B1 | 2/2002 | Mäckle et al. | ............. 280/5.521 |
| 10,137,928 B2 * | 11/2018 | Oya | ........................ B62D 5/046 |
| 2016/0176440 A1 | 6/2016 | Witte et al. | ..................... 701/23 |

FOREIGN PATENT DOCUMENTS

| | | | | |
|---|---|---|---|---|
| DE | 102005011253 A1 | 9/2006 | ............... | B60G 7/02 |
| DE | 102005037973 A1 | 2/2007 | ............... | B62D 17/00 |
| DE | 102007024755 A1 | 11/2008 | ............... | B60G 3/18 |
| DE | 102014226781 A1 | 6/2016 | ............... | B62D 6/00 |
| DE | 102017215013 A1 | 2/2019 | ............... | B62D 5/04 |
| EP | 1053165 | 4/2003 | ........... | B60G 17/015 |
| EP | 2842833 A2 | 3/2015 | ............... | B62D 1/28 |
| EP | 3095675 A1 | 11/2016 | ............ | B62D 15/02 |
| WO | 2019/042640 A1 | 3/2019 | ............ | B62D 15/02 |

* cited by examiner

STEERING CONTROLLER AND METHOD FOR ASCERTAINING AN ACTUATING SIGNAL FOR A POWER ELECTRONICS UNIT OF A STEERING APPARATUS OF A MOTOR VEHICLE

CROSS-REFERENCE TO RELATED APPLICATIONS

This application claims priority to German Patent Application No. DE 10 2017 215 013.0, filed on Aug. 28, 2017 with the German Patent and Trademark Office. The contents of the aforesaid Patent Application are incorporated herein for all purposes.

TECHNICAL FIELD

The invention relates to a steering controller and a method for ascertaining an actuating signal for a power electronics unit of a steering apparatus of a motor vehicle.

BACKGROUND

Modern motor vehicles have an electric servomotor that generates an additional or exclusive steering force (steer-by-wire) for deflecting the vehicle wheels. In doing so, a driver's request for the steering angle is for example detected by means of a torque or angle of rotation sensor in a steering column and is transmitted to a steering controller. The steering controller then generates a control signal for a power electronics unit which then generates corresponding control currents for the electric motor. In addition, driver assistance systems are known such as lane keeping systems that prevent the lane from being unintentionally left. These then supply signals to the steering controller in order to generate additional steering torques. In doing so, part of the requested steering torque is added to the input signal of the sensor, and a direct portion for the actuating signal is also generated. This division yields haptic feedback by the driver assistance system for the motor vehicle driver.

A method is known from DE 10 2014 226 781 A1 for determining a resulting setpoint for controlling a steering apparatus of a vehicle, wherein at least one setpoint for the automatic steering mode is determined in an automatic steering mode of a vehicle, wherein a setpoint for manual steering mode is determined, wherein the resulting setpoint is determined in that the setpoint for the automatic steering mode is modified depending on the setpoint for the manual steering mode. The resulting setpoint may be determined as the sum of the setpoint for the automatic steering mode and the setpoint for the manual steering mode.

SUMMARY

A technical object exists of creating an alternative steering controller as well as a method for ascertaining an actuating signal for a power electronics unit of a steering apparatus of a motor vehicle.

The object is solved by a steering controller having the features of the independent apparatus claim, and a method having the features of the independent method claim. Embodiments of the invention are the discussed in the dependent claims and the following description.

BRIEF DESCRIPTION OF THE DRAWINGS

Figure 1:
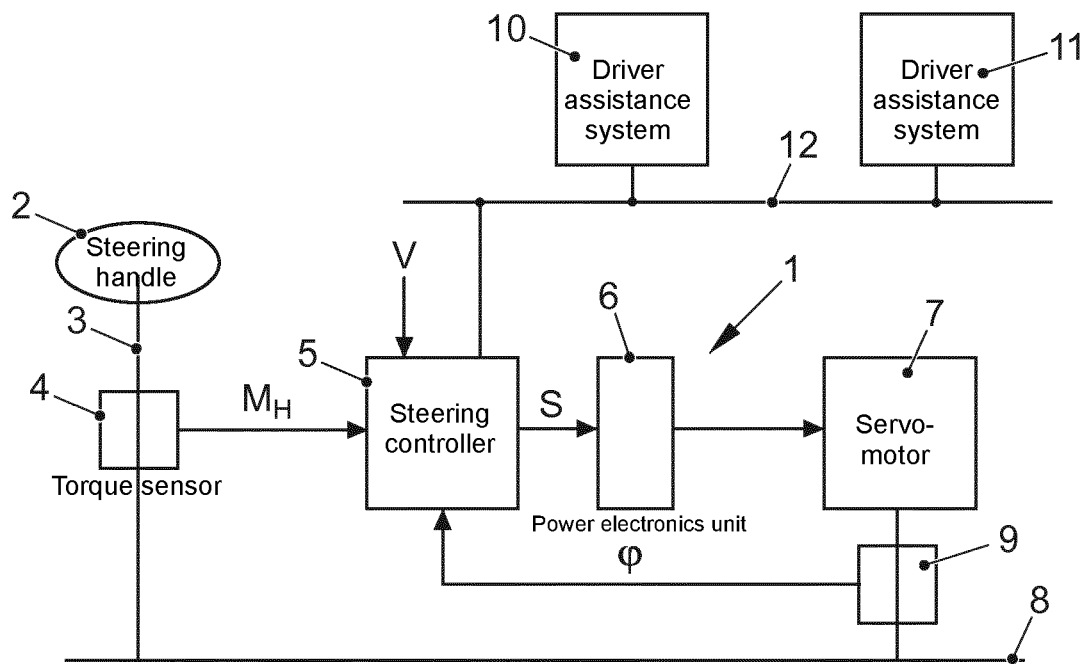
Figure 2:
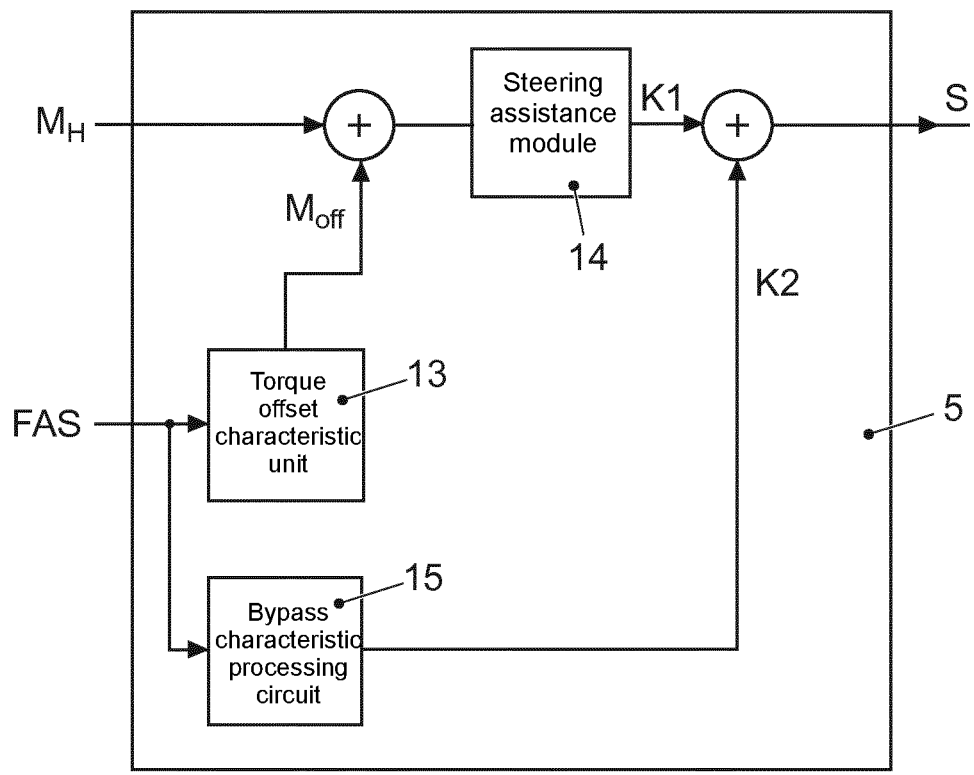
Figure 3:
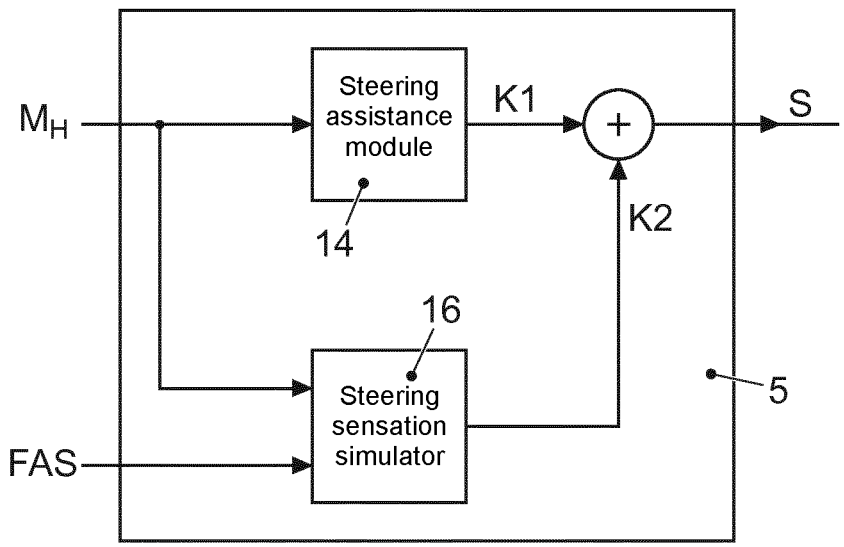

IN THE FIGS.:

FIG. 1 shows a schematic block diagram of a steering apparatus of a motor vehicle;

FIG. 2 shows a block diagram of a steering controller (state-of-the-art);

FIG. 3 shows a steering controller of a first embodiment; and

Figure 4:
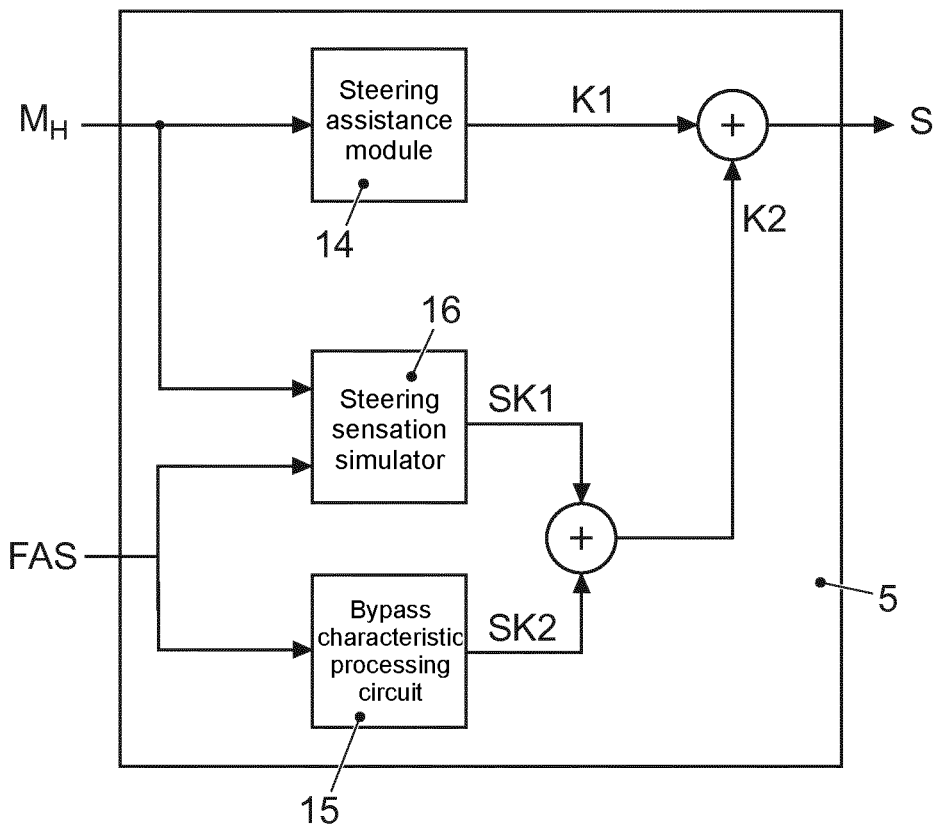

FIG. 4 shows a steering controller of a second embodiment.

DETAILED DESCRIPTION

According to a first exemplary aspect, the steering controller is configured in such a way as to obtain input signals from at least one sensor for detecting a steering request by a motor vehicle driver and at least one driver assistance system. The steering controller is furthermore designed to generate an actuating signal for a power electronics unit, wherein the actuating signal is composed of two components, i.e., a first component and a second component, wherein the first component is ascertained from the input signal of the at least one sensor, wherein the signals of the driver assistance system do not have any influence on the first component, and the second component is ascertained from the input signals of the at least one driver assistance system, wherein the signals of the sensor are taken into account in the second component.

A basic idea in this context is to subtract the haptic sensation of the driver assistance system from the actual steering assistance and model it separately. This yields two benefits, i.e., on the one hand, changes in the steering assistance function (such as changes in the coding or setting of the steering assistance function) do not have any influence on the calculation of the portions of the driver assistance system, and on the other hand, the portion may be calculated easily on the basis of the driver assistance systems, which for example is necessary to monitor the maintenance of certain limit values.

Two solutions for implementing the generation of the second component exist in principle.

In a first embodiment, the second component is ascertained exclusively in a steering sensation simulation unit.

In an alternative embodiment, the steering controller is designed so that the second component is composed of at least two subcomponents, wherein a first subcomponent is ascertained in a steering sensation simulation unit, and a second subcomponent is ascertained in a bypass characteristic unit.

The benefit of the first embodiment is that only a single unit is needed, whereas the second embodiment is easier to implement in existing systems.

With respect to the particulars of a corresponding method, reference is made to the entire content of the preceding discussion.

The invention will be explained in the following in more detail with reference to further exemplary embodiments.

FIG. 1 schematically shows a steering apparatus 1 of a motor vehicle that has a steering handle 2 which is connected to an input shaft 3. A torque sensor 4 is arranged on the input shaft 3 that detects manual torque $M_H$ on the steering handle 2. Moreover, the steering apparatus 1 has a steering controller 5, a power electronics unit 6, an electric servomotor 7 and a rack 8. The servomotor 7 has a rotor position sensor 9, from the signals of which the position of the rack 8 and therefore the steering angle may be inferred.

The signals from the torque sensor 4 and the signals from the driver assistance systems 10, 11 are fed to the steering controller 5. The driver assistance systems 10, 11 and steering controller 5 are connected to each other by a bus system 12. Moreover, the steering controller 5 also obtains at least the driving speed V from a sensor or controller (not shown). Depending on the input variables $M_H$, V and requests from the driver assistance systems 10, 11, the steering controller 5 generates an actuating signal S for the power electronics unit 6 that then correspondingly energizes the servomotor 7 so that it can move the rack 8. In this case, the servomotor 7 can be connected to the rack 8 by a ball head gear (not shown). The rotor position sensor 9 supplies a rotor angle φ, by means of which the position of the rack 8 may be ascertained based on the known transmission ratio. It is also noted that the input shaft 3 can, but does not have to, be mechanically engaged with the rack 8. The actuating signal S is composed in this case from two components which will be further explained below with reference to FIGS. 2 to 4, wherein the driving speed V will be omitted for the sake of simplicity.

A steering controller 5 according to the state-of-the-art is shown in FIG. 2. In this case, the manual torque $M_H$ and a request FAS from a driver assistance system 10, 11 are entered into the steering controller 5 as an input variable. In a manual torque offset characteristic module 13, an offset portion $M_{OFF}$ is ascertained that is to be added to the manual torque $M_H$ due to the request FAS so that an FAS-specific steering sensation can be represented. The sum of the manual torque $M_H$ and offset portion $M_{OFF}$ is then converted in a steering assistance module 14 into a first component K1 for the actuating signal S by means of a characteristic, or respectively a characteristic set. In doing so, the motor vehicle speed V, for example, is also included as a parameter. In addition, a second component K2 for the actuating signal S is generated in a bypass characteristic unit 15 so that a sufficiently large force may be generated on the rack 8 for the driver assistance system.

FIG. 3 shows a first embodiment. The steering controller 5 has a steering sensation simulation unit 16. This is fed the manual torque $M_H$ in addition to the request FAS from the driver assistance system 10, 11. The steering sensation simulation unit 16 has a manual torque-dependent characteristic, wherein a force is saved by a torque offset. This corresponds to the portion that was generated by the offset portion $M_{OFF}$ in the steering assistance module 14 (according to FIG. 2). The portion from the bypass characteristic unit 15 may also be added to this portion. The benefit is that a change in the steering assistance characteristics in the steering assistance module 14 no longer has any effects on the adjustment of the driver assistance systems. Another benefit is that the entire portion of the driver assistance system is in the second component K2. Accordingly, the portion of the driver assistance system may be ascertained very easily and for example monitored so that the portion of the driver assistance system does not exceed absolute or relative limit values of the steering default.

An alternative embodiment is shown in FIG. 4, wherein a bypass characteristic unit 15 is provided in addition to the steering sensation simulation unit 16. In this case, the steering sensation simulation unit 16 forms a first subcomponent SK1, and the bypass characteristic unit 15 forms a second subcomponent SK2, the sum of which forms the second component K2 for the actuating signal S. The benefit of this embodiment is that it is structurally more similar to the embodiment according to FIG. 2 since the bypass characteristic unit 15 may be adopted unchanged. Accordingly, the force needed for the driver assistance system 10, 11 may also be set by the rack 8 independent of the steering sensation simulation unit 16.

The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfill the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A steering controller, wherein
   the steering controller is configured to obtain input signals from at least one sensor for detecting a steering request by a motor vehicle driver and at least one driver assistance system; wherein
   the steering controller is also configured to generate an actuating signal for a power electronics unit, wherein the actuating signal is provided from a first component and a second component; wherein
   the steering controller is configured so that the first component is ascertained from the input signal from the at least one sensor; wherein
   the signals from the driver assistance system have no influence on the first component, and the second component is ascertained from the input signals from the at least one driver assistance system; wherein
   the signals from the sensor are taken into account in the second component; and
   the steering controller is configured so that the second component is composed of at least of two subcomponents and a first subcomponent is ascertained in a steering sensation simulator and a second subcomponent is ascertained in a bypass characteristic processing circuit, wherein the steering sensation simulator receives the input signals from at the least one sensor and at the least one driver assistance system.

2. A method for ascertaining an actuating signal for a power electronics unit of a steering apparatus of a motor vehicle using at least one steering controller, at least one sensor for detecting a steering request of a motor vehicle driver and at least one driver assistance system; comprising providing the actuating signal from a first component and a second component; wherein
   the first component is ascertained from the input signal from the at least one sensor; wherein
   the signals from the driver assistance system have no influence on the first component, and the second component is ascertained from the input signals from the at least one driver assistance system; wherein
   the signals from the sensor are taken into account in the second component;
   the second component is ascertained in a steering sensation simulator, which steering sensation simulator receives the input signals from at the least one sensor and at the least one driver assistance system; or
   the second component is composed of at least of two subcomponents and a first subcomponent is ascertained in a steering sensation simulator, and a second subcomponent is ascertained in a bypass characteristic processing circuit, wherein the steering sensation simulator receives the input signals from at the least one sensor and at the least one driver assistance system.

3. A steering controller, wherein the steering controller is configured to obtain input signals from at least one sensor for detecting a steering request by a motor vehicle driver and at least one driver assistance system; wherein the steering controller is also configured to generate an actuating signal for a power electronics unit, wherein the actuating signal is provided from a first component and a second component; wherein the steering controller is configured so that the first component is ascertained from the input signal from the at least one sensor; wherein the signals from the driver assistance system have no influence on the first component, and the second component is ascertained from the input signals from the at least one driver assistance system; wherein the signals from the sensor are taken into account in the second component; and the steering controller is configured so that the second component is ascertained in a steering sensation simulator, which steering sensation simulator receives the input signals from at the least one sensor and at the least one driver assistance system.

* * * * *